(12) United States Patent
Sugiyama (10) Patent No.: US 7,676,072 B2
(45) Date of Patent: Mar. 9, 2010

(54) IMAGE PROCESSING APPARATUS AND IMAGE PROCESSING METHOD

(75) Inventor: Naoki Sugiyama, Otawara (JP)

(73) Assignees: Kabushiki Kaisha Toshiba, Tokyo (JP); Toshiba Medical Systems Corporation, Otawara-shi (JP)

( * ) Notice: Subject to any disclaimer, the term of this patent is extended or adjusted under 35 U.S.C. 154(b) by 754 days.

(21) Appl. No.: 11/452,335

(22) Filed: Jun. 14, 2006

(65) Prior Publication Data

US 2007/0280522 A1 Dec. 6, 2007

(30) Foreign Application Priority Data

Jun. 15, 2005 (JP) .............................. 2005-175359

(51) Int. Cl.
*G06K 9/00* (2006.01)

(52) U.S. Cl. ...................... 382/128; 382/100; 382/131; 382/132; 600/431

(58) Field of Classification Search ................ 382/100, 382/110, 128, 294; 600/431, 410, 426; 345/1.1; 128/922; 250/455
See application file for complete search history.

(56) References Cited

U.S. PATENT DOCUMENTS

| 5,359,513 | A | | 10/1994 | Kano et al. |
| 5,839,440 | A | * | 11/1998 | Liou et al. ................. 600/431 |
| 2006/0247513 | A1 | * | 11/2006 | Wang et al. ................. 600/410 |
| 2008/0262345 | A1 | * | 10/2008 | Fichtinger et al. ........... 600/426 |
| 2009/0213034 | A1 | * | 8/2009 | Wu et al. ..................... 345/1.1 |

FOREIGN PATENT DOCUMENTS

| JP | 7-37074 | 2/1995 |
| JP | 2004-96417 | 3/2004 |

* cited by examiner

*Primary Examiner*—Vikkram Bali
*Assistant Examiner*—Ali Bayat
(74) *Attorney, Agent, or Firm*—Oblon, Spivak, McClelland, Maier & Neustadt, L.L.P.

(57) ABSTRACT

A superimposed image generation unit generates a two-dimensional superimposed image obtained by superimposing pieces of information of a plurality of volume data as corresponding objects along a predetermined direction (e.g., a direction crossing a body axis at right angles). A correspondence processing unit performs correspondence (positioning) between different volume data in accordance with a position of a characteristic portion on the superimposed image.

16 Claims, 9 Drawing Sheets

IMAGE PROCESSING APPARATUS AND IMAGE PROCESSING METHOD

CROSS-REFERENCE TO RELATED APPLICATIONS

This application is based upon and claims the benefit of priority from prior Japanese Patent Application No. 2005-175359, filed Jun. 15, 2005, the entire contents of which are incorporated herein by reference.

BACKGROUND OF THE INVENTION

1. Field of the Invention

The present invention relates to an image processing apparatus and an image processing method capable of suitably executing positioning between volume data acquired by the same modality or different modalities.

2. Description of the Related Art

In recent years, an image processing apparatus for use in a medical image field is used in combination with a medical imaging apparatus such as an ultrasonic diagnosis apparatus, an X-ray CT scanner or a magnetic resonant imaging apparatus, and the image processing apparatus is broadly utilized in many hospitals, inspection institutions and the like. In this image processing apparatus, improvement of an image processing speed or resolution advances, and various images can be presented which are useful as clinical information. The apparatus is utilized in forming a gastrointestinal tract image during checking of causes for blood vessel running, gastrointestinal tumor, formation of plaques (spots), stenochoria or the like in, for example, simulation or the like before an operation.

In image diagnosis in which such image processing apparatus is utilized, there is a case where there are compared, with one another, image groups (constituted of a plurality of two-dimensional image data, referred to also as volume data) collected in different timings (times) or different modalities, and a progress of an affected part with an elapse of time is observed. In this case, the image groups need to be corresponded (e.g., positioned) with each other. Heretofore, there has been, for example, an image processing apparatus in which a local subtraction image is generated by subtraction of an image of a diagnosis region as a part of one specific image (digital image) and a local image of the corresponding region as a part of another image corresponding to this diagnosis region. Accordingly, a person who interprets a radiogram can interpret the radiogram, while confirming a change of the diagnosis region with an elapse of time or a difference between a region state and a normal state (see, e.g., Jpn. Pat. Appln. KOKAI Publication No. 7-37074). There is also an image processing apparatus in which a first image set and a second image set having different photographing times are subjected to MPR processing, respectively, and images are positioned using MPR images (see, e.g., Jpn. Pat. Appln. KOKAI Publication No. 2004-96417).

However, in the conventional image processing apparatus, in principle, each image needs to be positioned. Therefore, when the image groups including a plurality of image data, especially volume data, are corresponded with each other in a conventional technology, in principle, all images constituting the volume data need to be confirmed and positioned, and large operation burdens are imposed on an operator.

Moreover, in a case where image sets including a plurality of images are corresponded with each other by use of the MPR images, the MPR image indicates an arbitrary cut. Therefore, in a case where a characteristic portion which does not exist in the cut exists externally from an MPR object region, precision cannot be said to be sufficient in some case.

BRIEF SUMMARY OF THE INVENTION

The present invention has been developed in view of the above situations, and an object thereof is to provide an image processing apparatus and an image processing method capable of corresponding image groups with each other easily and suitably as compared with a conventional technology.

According to an aspect of the present invention, there is provided an image processing apparatus which comprises: a storage unit which stores a plurality of volume data; a first image generation unit to generate first superimposed images with respect to at least two of the plurality of volume data, each of the first superimposed images being a two-dimensional image obtained by superimposing information of one of at least two of the plurality of volume data along a first reference direction; a correspondence unit which performs spatial correspondence between the at least two volume data by using the first superimposed images; a second image generation unit to generate a second image by using the at least two volume data corresponded spatially, the second image having an image slice direction different from the first reference direction and corresponding to the same position or region between different volume data; and a display unit which displays the second image.

According to another aspect of the present invention, there is provided an image processing method which comprises: generating first superimposed images with respect to at least two of the plurality of volume data, each of the first superimposed images being a two-dimensional image obtained by superimposing information of one of at least two of the plurality of volume data along a first reference direction; performing spatial correspondence between the at least two volume data by using the first superimposed images; generate a second image by using the at least two volume data corresponded spatially, the second image having an image slice direction different from the first reference direction and corresponding to the same position or region between different volume data; and a display unit which displays the second image.

DETAILED DESCRIPTION OF THE INVENTION

There will be described hereinafter a first embodiment and a second embodiment of the present invention with reference to the drawings. It is to be noted that in the following description, constituting elements having substantially the same function and constitution are denoted with the same reference numerals, and redundant description is performed, if necessary.

Moreover, the present embodiment will be described in accordance with an example of an image processing apparatus as a single apparatus connected to a medical imaging apparatus or an image server via a network. However, the present invention is not limited to this embodiment, and a technical thought of the present invention may be realized by a medical imaging apparatus (e.g., a tomographic X-ray computer apparatus, a magnetic resonant imaging apparatus, an ultrasonic diagnosis apparatus, an X-ray diagnosis apparatus, a nuclear medical diagnosis apparatus or the like) which contains the image processing apparatus (or which realizes a function similar to that of the image processing apparatus). The technical thought may be realized by installing a program which executes a function similar to that of the image processing apparatus in a computer of a medical workstation or the like to develop the program in a memory. At this time, the program capable of allowing the computer to execute the technology may be stored in a recording medium such as a magnetic disk (floppy (registered trademark) disk, hard disk or the like), an optical disk (CD-ROM, DVD or the like) or a semiconductor memory to distribute the program stored in the recording medium.

First Embodiment

Figure 1:
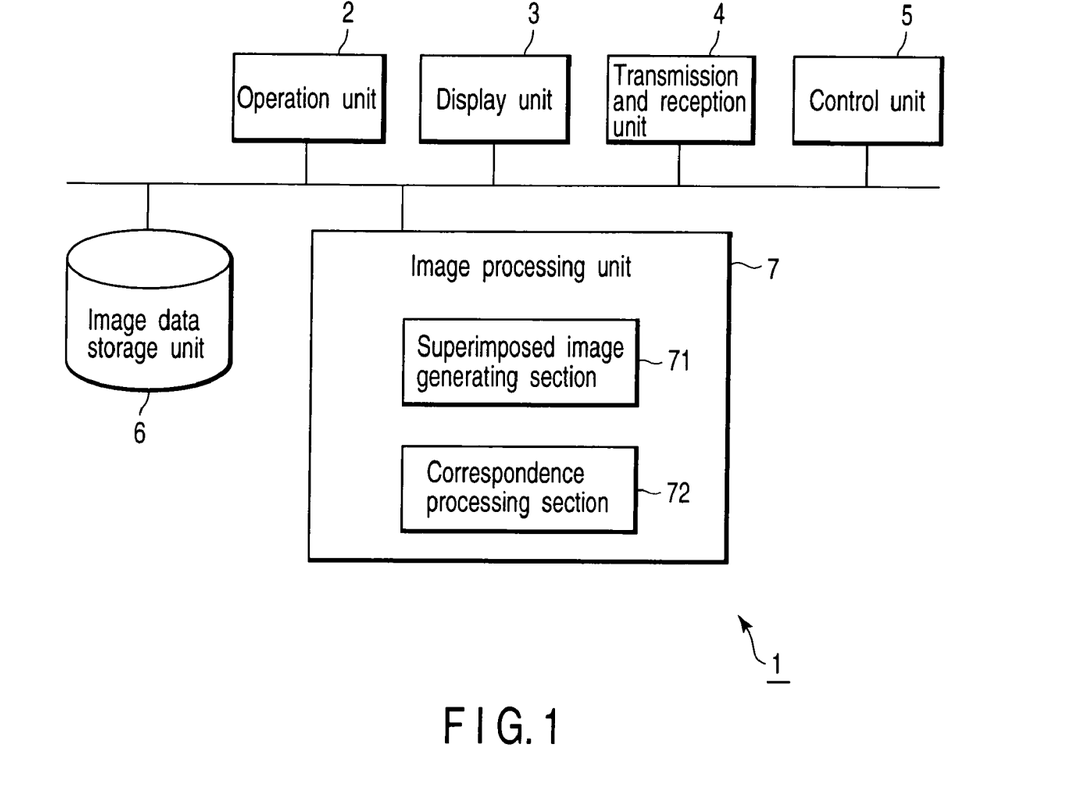
FIG. 1 is a block diagram showing a constitution of an image processing apparatus 1 in a first embodiment.

FIG. 1 is a block diagram showing a constitution of an image processing apparatus 1 in a first embodiment. As shown in FIG. 1, the present image processing apparatus 1 includes an operation unit 2, a display unit 3, a transmission and reception unit 4, a control unit 5, an image data storage unit 6 and an image processing unit 7.

The operation unit 2 has a track ball, various switches, a mouse, a keyboard and the like which takes various instructions, conditions and the like from an operator into the apparatus 1.

The display unit 3 displays an image, an input screen for performing a predetermined operation and the like in a predetermined configuration.

The transmission and reception unit 4 transmits and receives information including image data with respect to another apparatus via a network.

The control unit 5 dynamically or statically controls the units constituting the image processing apparatus 1. Especially, the control unit 5 generally controls the image data storage unit 6, the image processing unit 7, the operation unit 2, the display unit 3 and the like in image data correspondence processing described later. The control unit 5 generates a synthesized image or the like for parallel display, superimposed display or fusion-image display of a plurality of images in accordance with a predetermined program.

The image data storage unit 6 stores a plurality of volume data acquired by the transmission and reception unit 4 via a network. The plurality of volume data are acquired by the same or different medical imaging apparatuses (may be of any of the same modality, the same type of modality or different modalities). Each volume data does not necessarily have to relate to the same subject, and may relate to different subjects.

The image processing unit 7 executes various types of image processing, especially image data correspondence processing described later, and has a superimposed image generating section 71 and a correspondence processing section 72.

The superimposed image generating section 71 generates a superimposed image for each volume data by use of the volume data.

The correspondence processing section 72 performs spatial correspondence (positioning) between different volume data by use of the superimposed image generated for each volume data by the superimposed image generating section 71.

(Image Data Associating Function)

Next, there will be described an image data corresponding function of the present image processing apparatus 1. This function generates a superimposed image which is a two-dimensional image obtained by superimposing pieces of information of the volume data as corresponding objects along a predetermined direction, and performs spatial correspondence between the different volume data by use of this superimposed image.

Figure 2A:
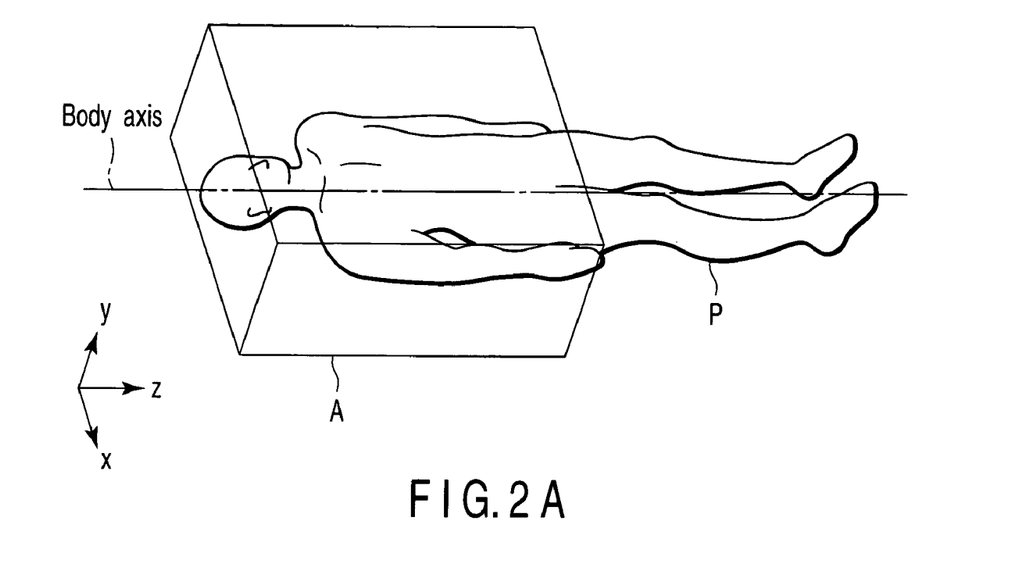
FIGS. 2A and 2B are explanatory views of a concept of an image data corresponding function of the image processing apparatus 1 in the first embodiment.
Figure 2B:
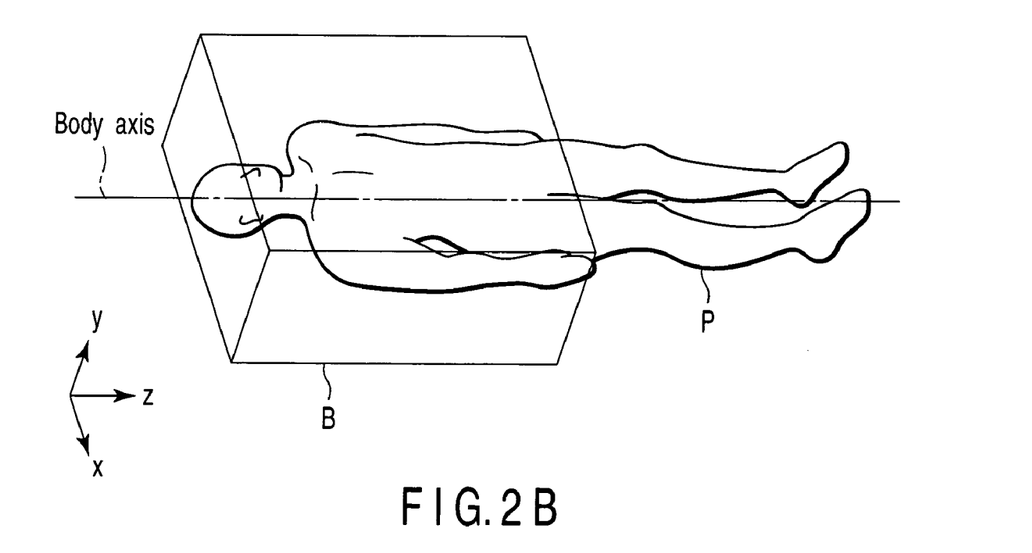

FIGS. 2A, 2B, 3A and 3B are explanatory views of a concept of the image data corresponding function of the image processing apparatus 1. FIG. 2A schematically shows volume data A acquired by photographing a subject A by a medical imaging apparatus A, and FIG. 2B schematically shows volume data B acquired by photographing a subject B by a medical imaging apparatus B. It is to be noted that there is not any special restriction on the volume data as long as the volume data A is physically different from the volume data B. Therefore, for example, the subjects A and B may be the same person or separate persons, and the medical imaging apparatuses A and B may be the same apparatus, the same type of apparatuses or different types of apparatuses. Furthermore, the volume data is not restricted by the presence of a contrast medium for use in the photographing.

The present image data corresponding function first generates a superimposed image obtained by superimposing pieces of information of the volume data A and B along a reference direction. Here, the reference direction for use in generating the superimposed image is selected so that the direction is perpendicular to a slice direction of an image (diagnosis image) for final use in the diagnosis. In a case where the diagnosis image is, for example, an axial image, since the slice direction of the image is a body-axis (z-axis) direction, the reference direction becomes perpendicular (i.e., an x-axis or y-axis direction) to a boxy axis.

It is to be noted that in the present embodiment, to be more specific, it is assumed that the diagnosis image is an axial image and the reference direction is a y-axis direction. Therefore, the superimposed image generated by superimposing pieces of information of the volume data A and B along the y-axis direction (reference direction) is a coronal image. However, the present invention is not limited to this image.

For example, the reference direction may be an x-axis direction, and the superimposed image may be generated as a sagittal image.

Moreover, as a technology to generate the superimposed image along the reference direction, it is possible to adopt, for example, maximum value MIP processing, minimum value MIP processing, or calculation of an average value concerning voxel data. When the superimposed image is generated, all of the voxel data does not have to be necessarily used. There may be used, for example, a part of volume data (slab) which has been cut out assuming that the reference direction is a thickness direction.

Figure 3A:
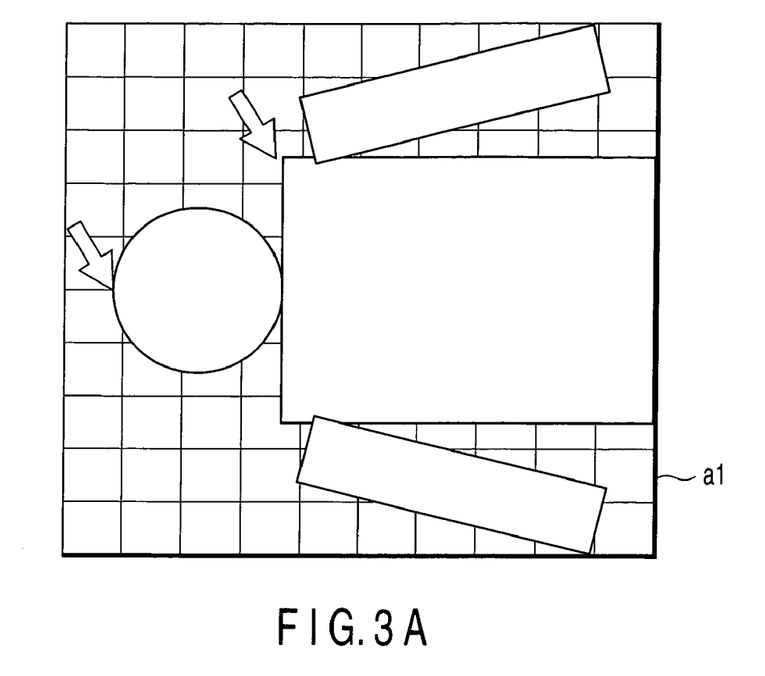
FIGS. 3A and 3B are explanatory views of the concept of the image data corresponding function of the image processing apparatus 1 in the first embodiment.
Figure 3B:
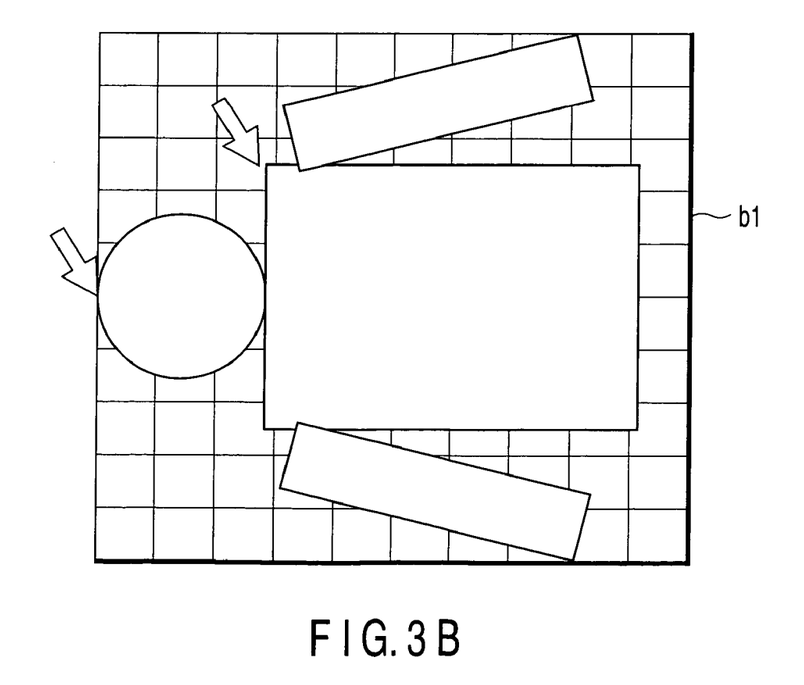

Next, the volume data are positioned using the superimposed image concerning the volume data A and B. FIG. 3A schematically shows a superimposed image a1 concerning the volume data A, and FIG. 3B schematically shows a superimposed image b1 concerning the volume data B. As shown in FIG. 3, a position of the superimposed image a1 does not correspond to that of the superimposed image b1. Therefore, a position of the volume data A does not correspond to that of the volume data B. Therefore, the positioning of the volume data A and B is realized on the basis of a positional relation between the superimposed image a1 and the superimposed image b1.

That is, the superimposed image a1 is compared with the superimposed image b1. For example, at least one of characteristic portions included in each volume data is detected by each superimposed image, and a movement amount or a conversion formula is calculated so that these image positions correspond to each other. When at least one of the volume data A and B is moved or converted using a calculation result, it is possible to realize spatial correspondence between both of the data.

Examples of the characteristic portion for use in calculating the movement amount or the conversion formula include head top, acromion, distant end of lung, lower end of lung, and upper end of heart. There is not any restriction on the number of the characteristic portions as the references. When as many portions as possible are used as the references, higher-precision positioning or fine adjustment is possible. The correspondence between the volume data by use of this characteristic amount as the reference may be realized by a manual operation executed via the operation unit 2, in addition to automatic processing in the correspondence processing section 72. The correspondence by the automatic processing of the correspondence processing section 72 may be combined with the correspondence by the manual operation. In such case, when, for example, the correspondence by the automatic processing is manually finely adjusted later, it is possible to expand a degree of freedom of the operation in corresponding the volume data with each other.

When the spatial correspondence is executed by the present function, the image of the position corresponding to that of the image selected from one volume data can automatically be selected from the other volume data. It is assumed that, for example, after the spatial correspondence, a desired image (selected image) is selected from the two-dimensional images constituting the volume data A by a predetermined operation of the operation unit 2. In response to this selecting operation, the control unit 5 automatically selects the image (corresponding image) having the position corresponding to that of the selected image from the two-dimensional images constituting the volume data B. The selected image and the corresponding image are displayed in the display unit 3 in a predetermined configuration.

Figure 4:
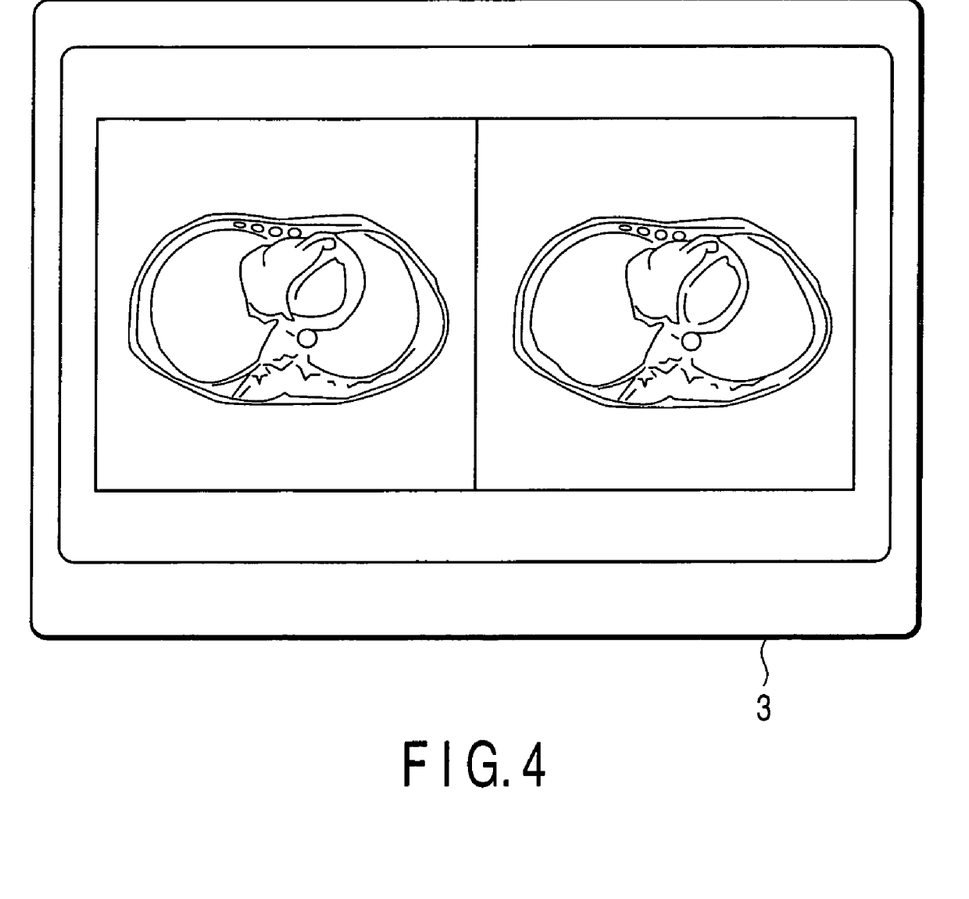
FIG. 4 is a diagram showing one example of a display configuration of an image corresponded by the image data corresponding function.

FIG. 4 is a diagram showing that the selected image and the corresponding image are displayed in parallel as one example of parallel display. The display configuration of the selected image and the corresponding image is not limited to an example of the parallel display of FIG. 5. There may be adopted various display configurations such as: a configuration in which the position of the selected image is corresponded with that of the corresponding image to perform superimposed display; a configuration in which a front image in a screen is displayed to be translucent in the superimposed display; a configuration in which there is displayed a subtraction image generated from the selected image and the corresponding image; and a configuration in which one image (i.e., the selected image or the corresponding image) is displayed in an only concerned region designated in the superimposed display. In the present image processing apparatus 1, an I/F for indicating any of the display configurations is disposed in the operation unit 2. When a desired I/F is operated, an operator can adopt an arbitrary display method.

It is to be noted that since the spatial correspondence between the volume data is performed using the positional relation between the superimposed image a1 and the superimposed image b1 in this manner, it is possible to perform correct spatial correspondence between the volume data A and the volume data B in two directions (x-direction and z-direction in the example of FIG. 2) other than the direction (i.e., reference direction) perpendicular to the superimposed images a1 and b1. However, the spatial correspondence between the volume data A and the volume data B is not sufficient in the reference direction. This is because each of the superimposed images a1 and b1 is obtained by projecting the information on the reference direction on one image. In this case, the correspondence in the reference direction can be performed using, for example, the following two technologies.

Figure 5:
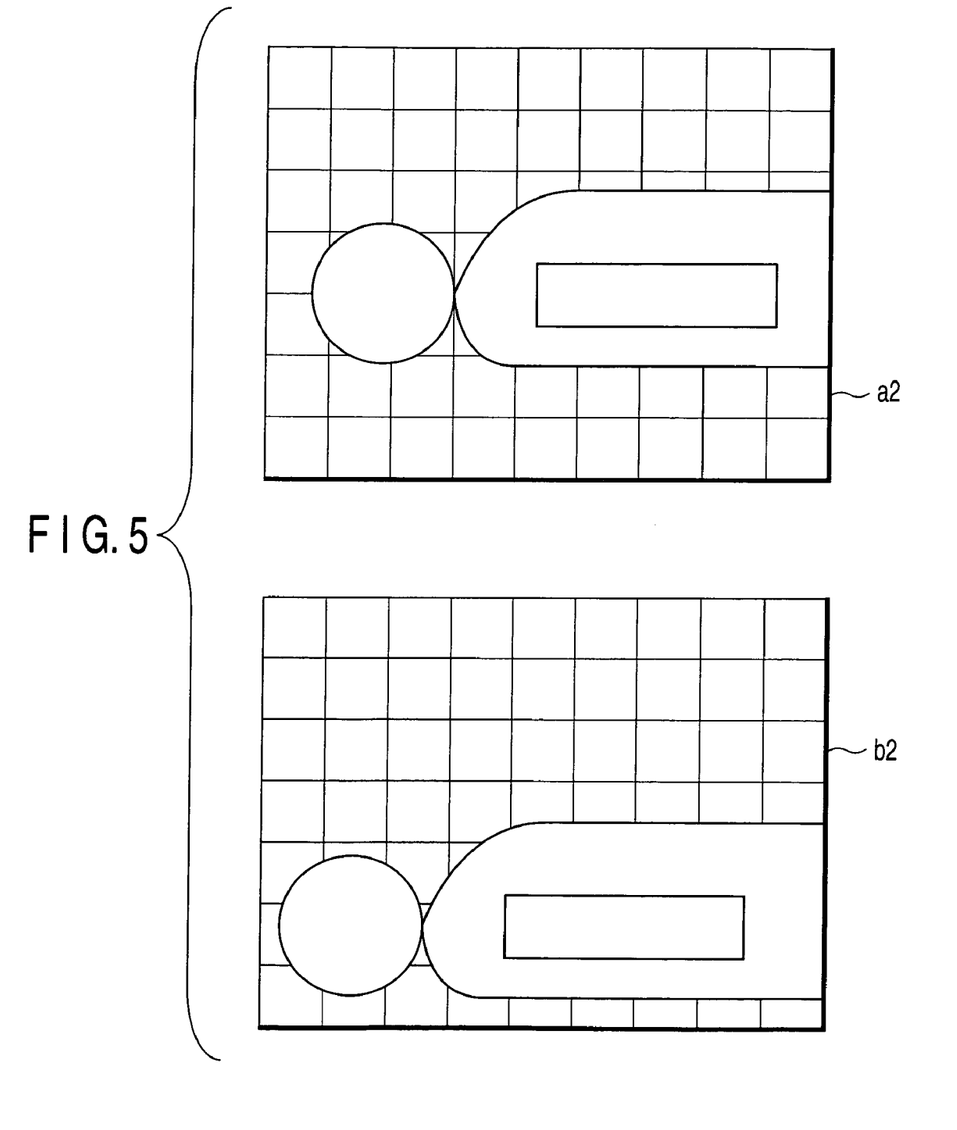
FIG. 5 is a diagram showing one example of image data correspondence using another superimposed image with respect to another reference direction.

In a first technology, the superimposed image is generated in the reference direction of the superimposed image a1 or b1 or in the reference direction other than the slice direction, and the spatial correspondence is performed between the volume data A and the volume data B in the reference direction by use of the superimposed image. That is, in the superimposed images a1 and b1 (coronal images), it is assumed that the y-axis direction is the reference direction. Therefore, as shown in FIG. 5, superimposed images (sagittal images) a2 and b2 are generated in which the reference direction is the x-axis direction other than the y-axis direction and the slice direction (z-axis direction), and further the spatial correspondence is performed between the volume data A and the volume data B by use of the superimposed images. In consequence, the volume data A can correctly be corresponded with the volume data B in all of x-axis, y-axis and z-axis directions.

In a second technology, the spatial correspondence between corresponded two-dimensional images is executed individually in the reference direction. For example, there is presumed a case where there is a deviation in a vertical direction between the selected image and the corresponding image which are displayed with parallel as shown in FIG. 4. This deviation in the vertical direction corresponds to that in the reference direction. In such case, the spatial correspondence is executed in the reference direction of the selected image and the corresponding image by the manual operation via the operation unit 2 or automatically. It is to be noted that in a case where the spatial correspondence in this reference direction is automatically performed, it is possible to utilized the above-described technology (see FIG. 3) used in positioning the superimposed image a1 and the superimposed image b1.

(Operation)

Next, there will be described an operation in processing (image data correspondence processing) by use of the image data corresponding function of the present image processing apparatus 1.

Figure 6:
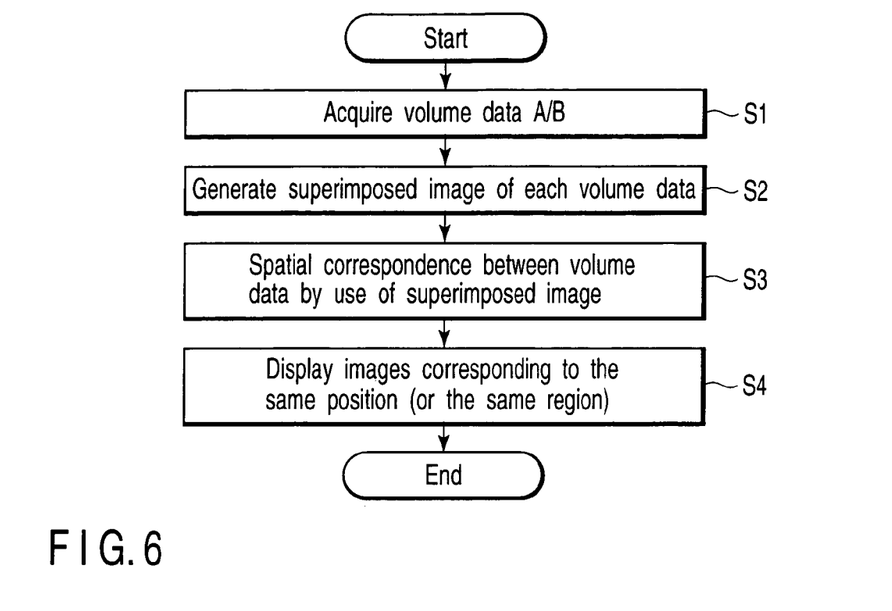
FIG. 6 is a flowchart showing a flow of steps executed in image data correspondence processing of the image processing apparatus 1 in the first embodiment.

FIG. 6 is a flowchart showing a flow of steps executed in image data correspondence processing of the image processing apparatus 1 in the first embodiment. As shown in FIG. 6, first the transmission and reception unit 4 acquires different volume data A and B from the same or different medical imaging apparatuses via a network. Alternatively, in response to a selecting operation from the operation unit 2, the volume data A and B are read out from the image data storage unit 6 (step S1).

Next, the superimposed image generating section 71 generates the superimposed images a1 and b1 concerning the volume data A and B (step S2), and the correspondence processing section 72 positions the volume data A and B by parallel movement such as affine transformation so that the position of the characteristic portion agrees with that of the characteristic portion between the superimposed image a1 and the superimposed image b1 (step S3).

Next, the control unit 5 displays (e.g., parallel display, superimposed display, fusion image display or the like) two two-dimensional images (axial images) corresponding to the same position between the volume data A and the volume data B in a predetermined configuration in accordance with, for example, an operator's instruction from the operation unit 2 (step S4). If necessary, the control unit 5 generates a subtraction image from two two-dimensional images corresponding to the same position between the volume data A and the volume data B to display the image.

According to the above constitution, the following effect can be obtained.

According to the present image processing apparatus, the volume data are positioned using the superimposed image. Since the superimposed image includes all of the characteristics of the volume data for use in the superimposed image, it can be said that the positioning between the volume data by use of the superimposed image is equivalent to indirect positioning by use of all position information of the volume data. Therefore, it is possible to realize higher-precision positioning between the volume data as compared with a conventional technology in which only one section is used (instead of the superimposed image).

Moreover, according to the present image processing apparatus, since the volume data are positioned using the superimposed image, different volume data can be positioned. Therefore, the two-dimensional images constituting the volume data do not have to be positioned, and the positioning between the volume data can be realized by a simple operation.

Furthermore, for example, the presently acquired volume data concerning a predetermined part of a predetermined patient is corresponded with the previously acquired volume data concerning the same affected part of the same patient, by use of the image data corresponding function of the present image processing apparatus. When the image corresponding to the same position between the volume data is displayed simultaneously or in the predetermined configuration, the change of the affected part with the elapse of time can visually be recognized with a high precision. Therefore, an observer such as a doctor can observe the simultaneously displayed image to easily observe the change of the affected part with the elapse of time.

It is to be noted that in general, in a case where the different volume data are compared with each other, slice widths of tomographic images constituting the respective data do not necessarily agree with each other. Therefore, in the above embodiment, for example, the slice width of the tomographic image constituting the volume data A is sometimes different from that of the tomographic image constituting the volume data B. However, even in such case, the position of the characteristic part can be specified regardless of the slice width of each volume data. Therefore, according to the present technology, it is constantly possible to realize the correspondence of the image data independently of the slice widths of the tomographic images constituting the respective volume data.

Second Embodiment

Next, a second embodiment of the present invention will be described. The present embodiment generates a deformed pattern based on a superimposed image, and allows a tomographic image in a predetermined position or region of one volume data to approximate as close as possible to a tomographic image in the corresponding position or region of the other volume data, by use of the deformed pattern.

Figure 7:
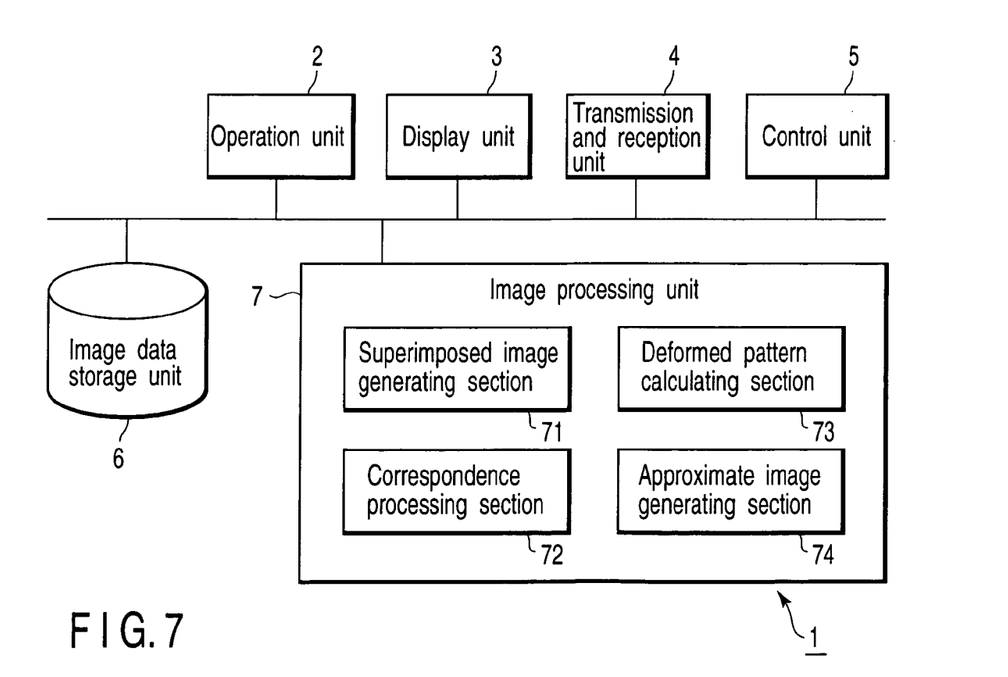
FIG. 7 shows a block diagram showing a constitution of an image processing apparatus 1 in a second embodiment.

FIG. 7 shows a block diagram showing a constitution of an image processing apparatus 1 in a second embodiment. When the image processing apparatus 1 of FIG. 7 is compared with that shown in FIG. 1, the present apparatus is different image taking an image processing unit 7 further includes a deformed pattern calculating section 73 and an approximate image generating section 74.

The deformed pattern calculating section 73 calculates a deformed pattern for comparing, with each other, superimposed images corresponded by, for example, the image data correspondence processing of the first embodiment, and allows one volume data (data used as a reference in generating an approximate image as described later) to approximate as close as possible to the other volume data (data subjected to deform processing in order to generate the approximate image). This deformed pattern is generated by, for example, dividing each superimposed image into small regions having the same pattern, and calculating a linear or nonlinear conversion formula for the corresponding small regions with each other. Alternatively, there may be generated, by use of a technology such as pattern matching, a moving map for each pixel (model of a movement pattern) which allows one superimposed image to approximate to the other superimposed image.

It is to be noted that in the present embodiment, to be more specific, it is assumed that data as a reference in generating the approximate image is volume data A and data to be subjected to deform processing to generate the approximate image is volume data B. Therefore, in this case, the deformed pattern is acquired by calculating a conversion formula which allows a superimposed image b1 to approximate to a superimposed image a1 or generating the model of the movement pattern.

The approximate image generating section 74 generates the approximate image by use of the deformed pattern calculated by the deformed pattern calculating section 73 and the image concerning the predetermined position or region of the volume data.

(Approximate Image Generating Function)

Next, there will be described an approximate image generating function of the present image processing apparatus 1.

Figure 8:
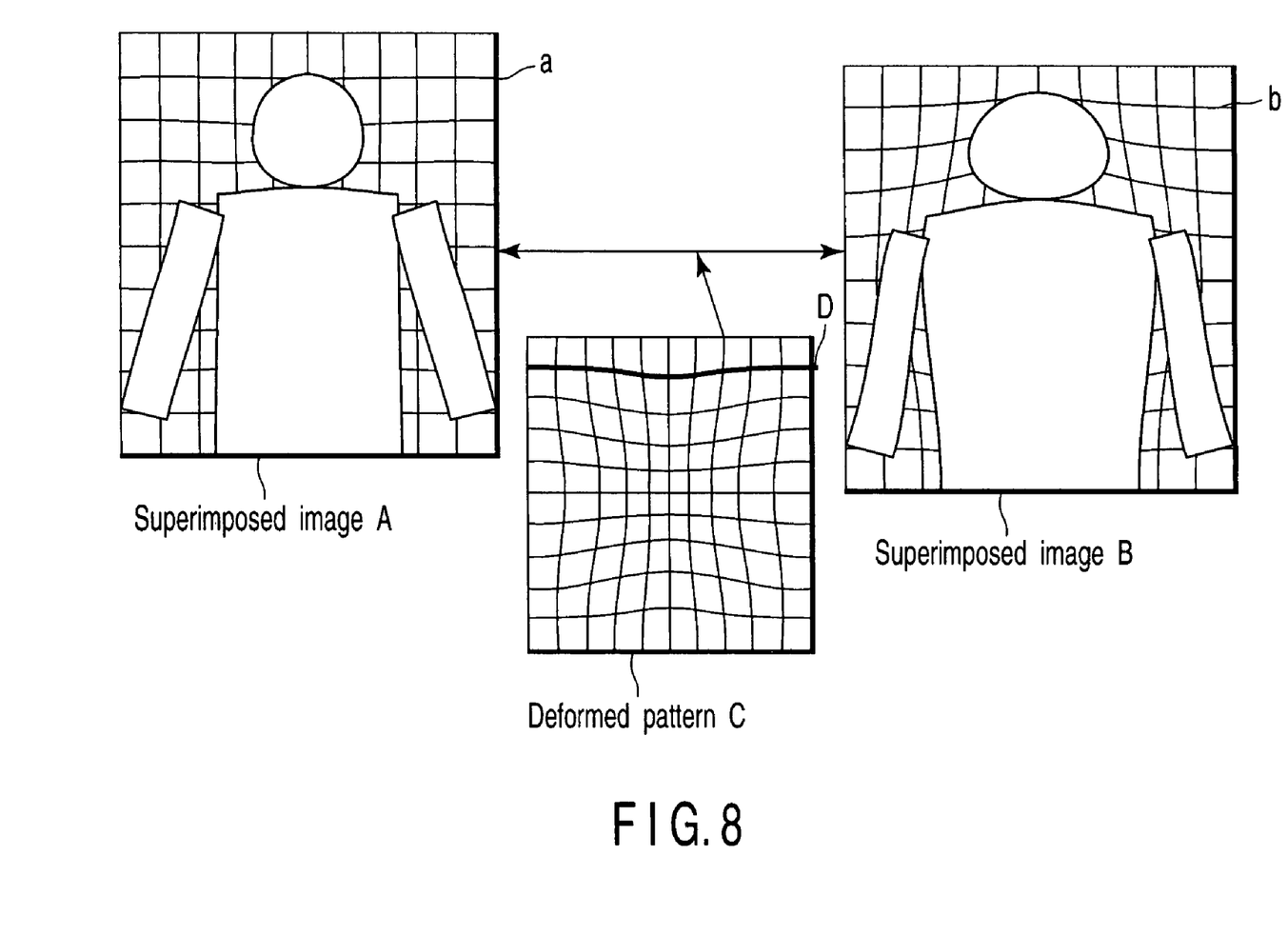
FIG. 8 is an explanatory view of a concept of an approximate image generating function of the image processing apparatus 1 in the second embodiment.

FIG. 8 is an explanatory view of a concept of the approximate image generating function of the image processing apparatus 1 in the second embodiment. As shown in FIG. 8, for example, a conversion formula is calculated to generate a deformed pattern C which allows a superimposed image b1 to approximate as close as possible to a superimposed image a1.

In a case where, for example, a diagnosis image is designated on the volume data A and the superimposed image a1, a position (curve b in FIG. 8) corresponding to that of the diagnosis image on the superimposed image b1 and the volume data B is specified by use of the generated deformed pattern C. The approximate image is generated by use of data of the corresponding positioned designated in the volume data B.

It is to be noted that positioned data of the superimposed image b1 is sometimes a curve (not a straight line) as in the curve b, the superimposed image corresponding to an axial image designated on the volume data A and generated by using the volume data B. In such case, the approximate image is generated like a curved MPR image.

Figure 9:
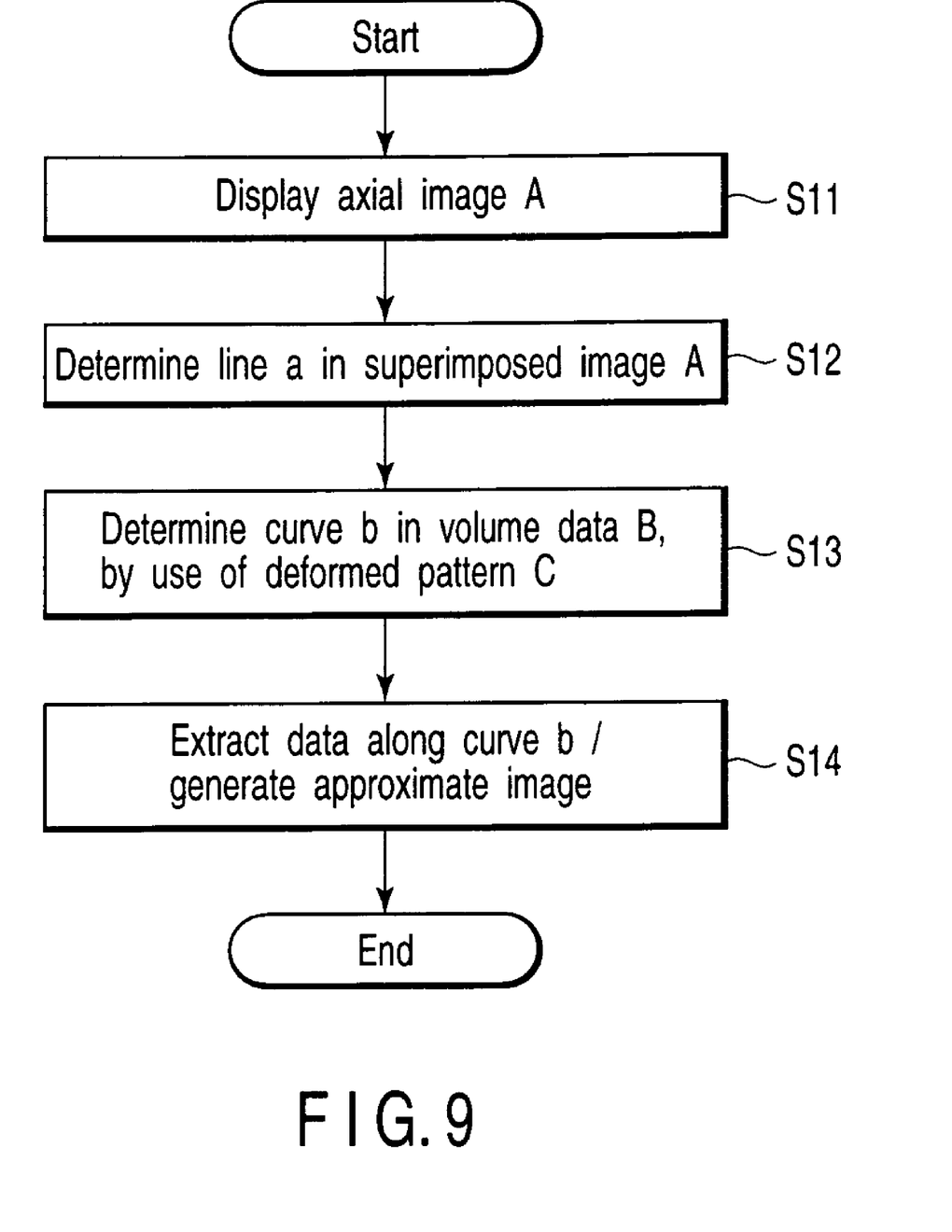
FIG. 9 is a flowchart showing a flow of steps (approximate image generation processing) using the present approximate image generating function.

FIG. 9 is a flowchart showing a flow of steps (approximate image generation processing) using the present approximate image generating function. First, in response to an input from an operation unit 2, a display unit 3 displays a predetermined tomographic image (e.g., axial image A) using the volume data A (step S11). It is to be noted that the volume data A and B have been subjected to spatial correspondence processing.

Next, the correspondence processing section 72 determines a position (e.g., line a) corresponding to the axial image A on the superimposed image a1 (coronal image) on which the volume data A has been superimposed (step S12). The section further determines a curve b corresponding to the line a on the superimposed image b1, by use of information (e.g., conversion formula for each small region, conversion table or the like) defined in a section D corresponding to the line a on the deformed pattern C (step S13).

Next, the approximate image generating section 74 extracts data along the curve b from the volume data B superimposed on the superimposed image b1, and generates the approximate image by use of the data (step S14).

It is to be noted that in the above approximate image generation processing, the approximate image generating section 74 automatically specifies and collects the corresponding position on the volume data B to obtain the data corresponding to the curve b. However, the corresponding position on the volume data B may be specified by a manual operation executed via the operation unit 2, in addition to automatic processing. The correspondence by the automatic processing of the correspondence processing section 72 may be combined with the correspondence by the manual operation. In such case, after performing the correspondence by, for example, the automatic processing, fine adjustment is manually performed. In this manner, it is possible to expand a degree of freedom of an operation in corresponding the volume data with each other.

(Operation)

Next, there will be described an operation in processing (approximate image generation processing) using the approximate image generating function of the present image processing apparatus 1.

Figure 10:
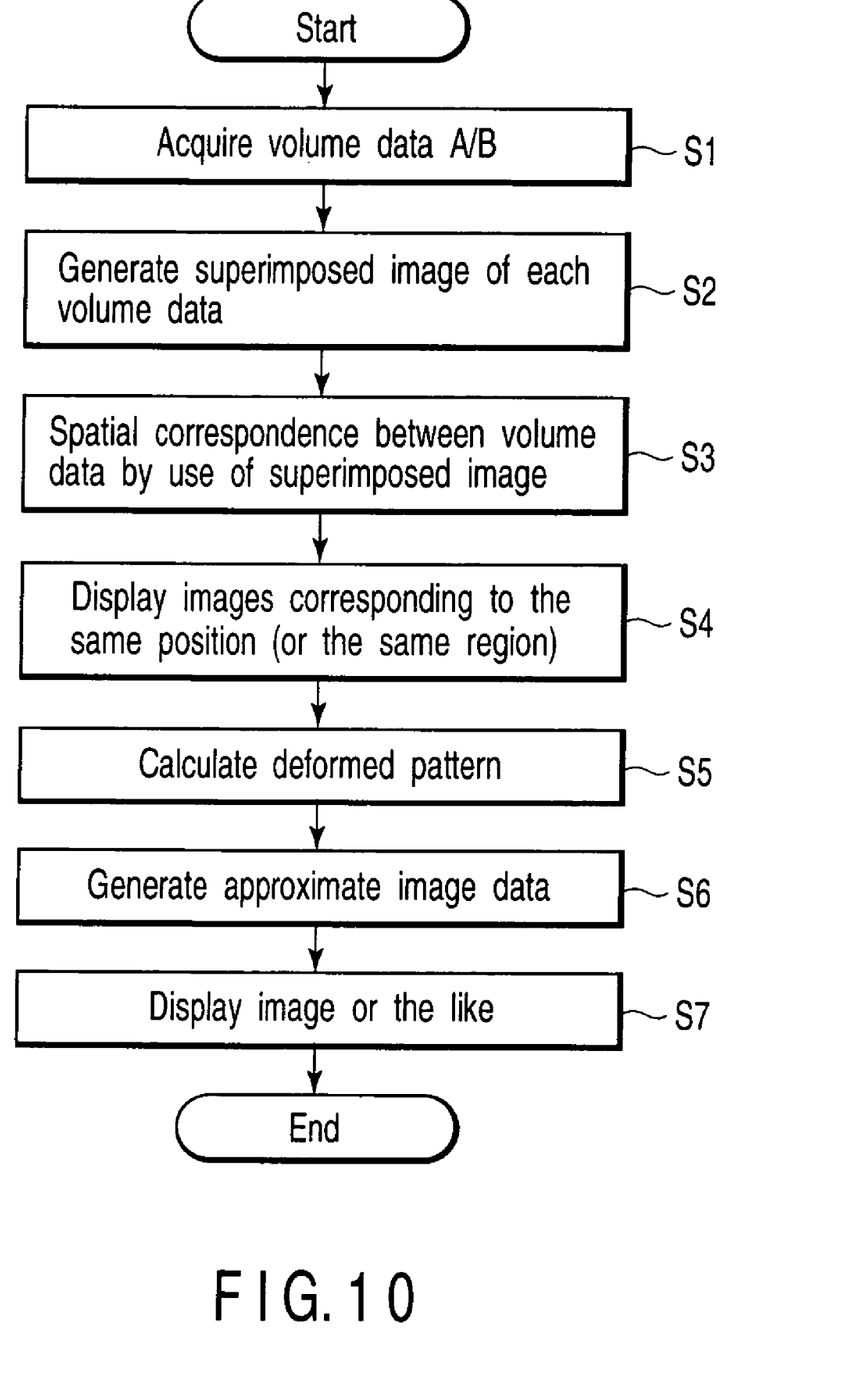
FIG. 10 is a flowchart showing a flow of steps of the approximate image generation processing of the image processing apparatus 1 in the second embodiment.

FIG. 10 is a flowchart showing a flow of the steps of the approximate image generation processing of the image processing apparatus 1 in the second embodiment. It is to be noted that in FIG. 10, steps S1 to S4 are substantially similar to contents described with reference to FIG. 6.

Next, the deformed pattern calculating section 73 generates the deformed pattern based on the superimposed images a1 and b1 (step S5).

The approximate image generating section 74 generates the approximate image approximate to the tomographic image concerning the predetermined position of the volume data A designated via the operation unit 2, by use of the deformed pattern and the volume data B (step S6). It is to be noted that specific processing of the step is shown in the steps S11 to S14 of FIG. 9.

Next, a control unit 5 displays the axial image A concerning the predetermined position of the volume data A and the approximate image concerning the axial image in a predetermined configuration (e.g., parallel display, superimposed display, fusion image display or the like) in accordance with, for example, an operator's instruction from the operation unit 2 (step S7). If necessary, the control unit 5 generates a subtraction image from the axial image A and the approximate image concerning this axial image, and displays this subtraction image.

According to the above constitution, it is possible to generate the tomographic image in the predetermined position of one volume data, and the approximate image from the tomographic image in the corresponding position of the other volume data, by use of the approximate image generating function of the present image processing apparatus. Therefore, for example, the presently acquired tomographic image in the predetermined position or region of the predetermined patient is display simultaneously with the approximate image using the previously acquired tomographic image in the corresponding position or region of the volume data of the same patient. Accordingly, particulars of the affected part with an elapse of time can visually be recognized with a high precision. Therefore, an observer such as the doctor can more easily and clearly observe the change of the affected part with the elapse of time, by use of the approximate image.

It is to be noted that the present invention is not limited as such to the above embodiment, and a constituting element can be deformed and embodied without departing from the scope in an implementing stage. Examples of a specific modification are as follows.

(1) Before the spatial correspondence described in the above embodiments, size correspondence processing may be performed between volume data to correspond pixel sizes and pitches with each other. It is assumed that, for example, volume data A acquired by a tomographic X-ray computer apparatus is constituted of two-dimensional image data of 512 pixels×512 pixels at a pixel pitch L1. On the other hand, it is assumed that volume data B acquired by a magnetic resonant imaging apparatus is constituted of two-dimensional image data of 256 pixels×256 pixels at a pixel pitch L2. In such case, for example, the correspondence processing section 72 subjects the volume data B to predetermined calculation processing such as affine transformation. Accordingly, the pixel size and pitch of the volume data B can be set to be equal to those of the volume data A. When such size correspondence processing between the volume data is performed, more correct spatial correspondence can be performed.

(2) In the above embodiments, there has been described an example of the spatial correspondence between the volume data A and B. However, the number of the volume data as corresponding objects is not limited to two, and the above spatial correspondence processing may be performed among more volume data.

Moreover, in a case where a plurality of volume data exist, each processing can be performed directly or indirectly. For example, there is assumed a case where the spatial correspondence is performed among four volume data in total including volume data E1, E2, F1 and F2. Here, the volume data E1 is constituted of a T1 emphasized image acquired by a magnetic resonant imaging apparatus E, and the volume data E2 is acquired by functional MRI (fMRI) photographing by use of modality E. The volume data F1 is constituted of a T1 emphasized image acquired by modality F, and the volume data F2 is acquired by the fMRI photographing by use of the magnetic resonant imaging apparatus E.

In such case, since the volume data E1 and E2 (or the volume data F1 and F2) are acquired by the same apparatus, the spatial correspondence between the data is performed. Therefore, when the spatial correspondence is executed between, for example, the volume data E1 and F1, it is possible to directly or indirectly perform the spatial correspondence among the volume data E1, E2, F1 and F2.

(3) When there is performed, between two or more volume data, spatial correspondence processing described in the first embodiment, the approximate image generation processing described in the second embodiment, the size correspondence processing described in the above (1) or the like, any of the volume data is regarded as reference volume data, and another volume data (volume data other than the reference volume data) only is sometimes converted and adapted to the reference volume data. In such case, the control unit 5 determines the reference volume data by, for example, the following technology.

In a first technology, the reference volume data is determined based on a time axis. In such technology, for example, the latest (or oldest) volume data is regarded as the reference volume data, and the other volume data is subjected to various types of processing so that the data is adapted to the reference volume data.

In a second technology, the reference volume data is determined based on a type of an image. In such technology, in a case where the positioning is performed between, for example, volume data concerning the T1 emphasized image and the volume data acquired by the fMRI photographing, the volume data acquired by the fMRI photographing is subjected to preprocessing so that the pixel size and pitch of the volume data are adapted to those of the volume data concerning the T1 emphasized image.

In a third technology, volume data concerning a standard image (schematic image judged to be standard from, for example, an anatomical viewpoint) is regarded as the reference volume data. In such technology, the volume data acquired by the photographing is subjected to various types of processing so that the volume data is adapted to the volume data concerning the standard image.

(4) In the above embodiments, an example has been described in which the axial images of the same position are cut out from the respective spatially corresponded volume data, and the image is diagnosed using the images. However, a use mode of the respective spatially corresponded volume data is not limited to this example, and an MPR image, a volume rendering image or the like may be generated and observed using, for example, each volume data.

(5) In the above embodiments, an example has been described in which the slice direction of the diagnosis image is perpendicular to the reference direction for use in the image data correspondence processing. However, the present invention is not limited to this example. The technical thought of the present invention is applicable even to a case where the slice direction of the diagnosis image is not perpendicular to the reference direction.

Moreover, an appropriate combination of a plurality of constituting elements described in the above embodiments can form various inventions. For example, several constituting elements may be removed from all constituting elements described in the embodiment. Furthermore, the constituting elements of the different embodiments may appropriately be combined.

What is claimed is:

1. An image processing apparatus comprising:
a storage unit which stores a plurality of volume data;
a first image generation unit to generate first superimposed images with respect to at least two of the plurality of volume data, each of the first superimposed images being a two-dimensional image obtained by superimposing information of one of at least two of the plurality of volume data along a first reference direction;
a correspondence unit which performs spatial correspondence between the at least two volume data by using the first superimposed images;
a second image generation unit to generate a second image by using the at least two volume data corresponded spatially, the second image having an image slice direction different from the first reference direction and corresponding to the same position or region between different volume data; and
a display unit which displays the second image.

2. The image processing apparatus according to claim 1, wherein the correspondence unit generates a deformed pattern to perform the spatial correspondence between the volume data, and
spatially corresponds at least two different volume data based on the deformed pattern.

3. The image processing apparatus according to claim 1, wherein the first image generation unit further generates second superimposed images which is a two-dimensional image obtained by superimposing information of one of at least two of the plurality of volume data along a second reference direction, the second reference direction being different from the first reference direction and the slice direction, and
the correspondence unit performs the spatial correspondence between the at least two volume data by using the first superimposed image and the second superimposed image.

4. The image processing apparatus according to claim 1, further comprising: a position adjustment unit which adjusts a position of the displayed image in a second reference direction which is different from the first reference direction and the slice direction.

5. The image processing apparatus according to claim 1, wherein the first superimposed image is any of a maximum intensity projected image, a minimum intensity projected image and an average value image using an average value of voxels constituting the volume data.

6. The image processing apparatus according to claim 3, wherein the second superimposed image is any of a maximum intensity projected image, a minimum intensity projected image and an average value image using an average value of voxels constituting the volume data.

7. The image processing apparatus according to claim 1, wherein the second image generation unit generates a fusion image, a superimposed image or a subtraction image based on the plurality of images corresponding to the same position or region between different volume data.

8. The image processing apparatus according to claim 1, wherein the first superimposed image is generated by using a part of the volume data.

9. The image processing apparatus according to claim 3, wherein the second superimposed image is generated by using a part of the volume data.

10. The image processing apparatus according to claim 1, wherein the slice direction is perpendicular to the first reference direction.

11. The image processing apparatus according to claim 3, wherein the slice direction, the first reference direction and the second reference direction cross one another at right angles.

12. The image processing apparatus according to claim 1, wherein the correspondence unit executes size-correspondence processing to correspond pixel pitches and sizes between the at least two volume data, and
generates the first superimposed image by use of the volume data subjected to the size-correspondence processing.

13. The image processing apparatus according to claim 12, wherein the correspondence unit selects reference volume data from the plurality of volume data based on time information on a time at which the volume data is acquired or a type of an image constituting the volume data, and
executes the size-correspondence processing of the other volume data in accordance with the pixel size and pitch of the reference volume data.

14. The image processing apparatus according to claim 12, wherein the correspondence unit selects reference volume data from the plurality of volume data based on time information on a time at which the volume data is acquired or a type of an image constituting the volume data, and
executes parallel movement processing of the other volume data so that the volume data is spatially corresponded with the reference volume data.

15. The image processing apparatus according to claim 1, wherein the storage unit stores volume data concerning a standard image,
the first image generation unit generates a third superimposed image which is a two-dimensional image obtained by superimposing pieces of information of the volume data concerning the standard image, and
the correspondence unit executes the spatial correspondence between the volume data, by using the first superimposed image and the third superimposed image.

16. An image processing method comprising:
generating first superimposed images with respect to at least two of the plurality of volume data, each of the first superimposed images being a two-dimensional image obtained by superimposing information of one of at least two of the plurality of volume data along a first reference direction;
performing spatial correspondence between the at least two volume data by using the first superimposed images;
generate a second image by using the at least two volume data corresponded spatially, the second image having an image slice direction different from the first reference direction and corresponding to the same position or region between different volume data; and
a display unit which displays the second image.

* * * * *